United States Patent Office 2,741,642
Patented Apr. 10, 1956

2,741,642

PROCESS FOR PREPARING 1,5 PRIMARY DICHLOROALKANES

Herbert K. Wiese, Cranford, N. J., assignor to Esso Research and Engineering Company, a corporation of Delaware No Drawing. Application October 11, 1951, Serial No. 250,947

4 Claims. (Cl. 260—658)

This invention relates to a novel process for the preparation of 1,5 primary dichloroalkanes from ethylene and nonvicinal dichloroalkanes containing one primary and one tertiary chlorine atom.

1,5 primary dichloroalkanes, because they contain two primary chlorine atoms, can be utilized for the production of many valuable products. For example, a synthetic lubricating oil or a plasticizer can be produced by reacting the dichlorides with two moles of a selected salt of an aliphatic or naphthenic acid. Glycols containing two primary hydroxyl groups can be obtained by hydrolyzing the dichlorides. They react with metal cyanides, producing dinitriles which can be converted to diamines or dibasic acids. The oxidation of the dichloroalkane products or their corresponding glycols produces dibasic acids. The ability of these compounds to react with acid salts to produce diesters is of particular significance. This reaction is characteristic of only primary dichloroalkanes, because other types of dichloroalkanes split out HCl in this type of reaction.

The valuable compounds of this invention have been difficult to obtain heretofore. Their preparation by methods known to the art has required a large number of reaction steps with consequent low yields and high costs. Attempts have been made in the past to produce similar products by reaction of vicinal polyhaloalkanes with various olefins. The products, however, have usually been monohalogen in nature due to the splitting out of HCl. Where the polyhalo products are obtained, they have not been of the primary chlorinated type such as discussed above.

This invention provides an improved method of preparing the indicated 1,5 primary dichloroalkanes. The method comprises reacting ethylene with a nonvicinal 1,3 dichloroalkane containing a tertiary chlorine atom in the presence of a Friedel-Crafts catalyst. After the reaction has proceeded, the catalyst is separated or is quenched by the addition of water or alcohol, etc. A separation into layers is made and the desired product is recovered by distillation in good yields.

The products obtained by this invention are thus rather specific in nature and characterized by the general formula

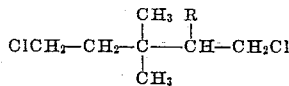

wherein R is a radical selected from the group consisting of hydrogen and methyl radicals.

Similarly, the nonvicinal 1,3 dichloroalkanes utilized in the reaction are also rather specific in nature and are characterized by the general formula

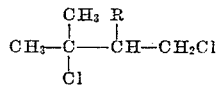

wherein R is the same as in the preceding formula.

A convenient way of producing the desired dichloride reactants is to contact such diolefins as isoprene or dimethylbutadiene with concentrated hydrochloric acid at temperatures ranging from 0° C. to 100° C. Anhydrous hydrogen chloride as such or in the presence of such solvents as diethyl ether or glacial acetic acid can also be employed. It is, of course, to be understood that dichloride reactants of the above type produced by other means, such as chlorination of tertiary olefins or isoparaffins, will work equally as well. For example, when contacting isoprene with concentrated hydrochloric acid at about 10° C. two moles of hydrogen chloride add to produce 1,3 dichloro-3-methylbutane.

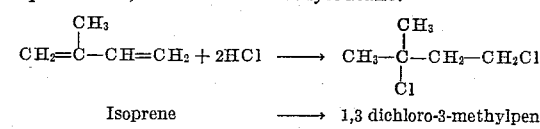

Isoprene ⟶ 1,3 dichloro-3-methylpentane

It should be noted that one of the chlorine atoms is tertiary in nature and one is primary in nature in the reactant compound. This structure and the nonvicinal positioning of these chlorine atoms is absolutely necessary for obtaining the desired products. The reactants utilized may thus be referred to as dihydrochlorides of isoprene or dimethylbutadiene.

The olefin reactant is ethylene. This is the only olefin which gives products in which both chlorine atoms are primary in nature. The use of other olefins results in the splitting out of HCl and the failure to obtain the products of this invention.

The reaction is pictured below, where the condensation of 1,3 dichloro-3-methylbutane with ethylene produces 1,5 dichloro-3,3-dimethylpentane.

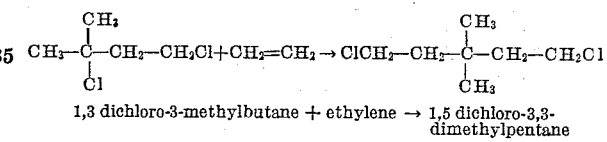

1,3 dichloro-3-methylbutane + ethylene → 1,5 dichloro-3,3-dimethylpentane

Countercurrent or concurrent contacting of the reactants with the catalysts in suitable towers or other mixing devices are suitable methods for carrying out the process. Instead of operating with the chlorinated reactant in the liquid phase and the ethylene in the gaseous phase, both may be in a liquid state. When gaseous ethylene is used it can be bubbled conveniently through a solution or suspension of aluminum chloride in the dihalogenated reactant. The reaction conditions depend on both the catalyst and the reactants used. The temperature ranges in general from −30° to 100° C. Low temperatures, for example, ranging from −30° to 10° C., are preferred with an active catalyst such as aluminum chloride. Higher temperatures ranging from 20° C. to 100° C. are necessary with less active catalysts such as FeCl₃, ZnCl₂, etc. Ethylene pressures ranging from 1 to 50 atmosphere can be employed depending on catalyst and reaction conditions. With aluminum chloride as catalyst an ethylene pressure of about 1 atmosphere suffices. The ethylene is normally present in excess. The reaction product is treated to remove or destroy the catalyst as taught above, phase separation is obtained if necessary, and the product distilled to recover the 1,5-primary chloroalkane. Unconverted reactants may, if desired, be recycled to the reactor.

As catalysts for the reaction, inorganic halides are used. Metal halides, particularly Friedel-Crafts type catalysts, are especially advantageous, but suitable hydrogen halides such as hydrogen fluoride may also be used. Aluminum chloride, aluminum bromide, ferric chloride, titanium tetrachloride and antimony trichloride have been found to be suitable. Less active catalysts such as stannous or stannic chloride, bismuth chloride, etc., may also be used. The catalysts may be used in solid form as lumps or granules, or finely divided powders, or may be deposited on supports or carriers which may be inert or may have an advantageous influence on the reaction.

The amount of catalyst depends in general on the particular catalyst and reaction conditions. Normally the amount will vary from less than 1 to 10 weight per cent based on the dichloride reactant. Solutions of the catalyst may also be employed, as may catalyst complexes well known in the art.

This invention will be better understood by reference to the following examples of the preparation of the indicated compounds according to the process of this invention.

EXAMPLE I

A slow stream of ethylene under essentially atmospheric pressure was passed through 1,3 dichloro-3-methylbutane (dihydrochloride of isoprene) containing 3.8 weight per cent aluminum chloride at about 0° C. After a reaction time of 30 minutes the reaction was halted by destroying the aluminum chloride with ice water. Distillation of the resulting reaction product showed that 62% of the 1,3 dichloro-3-methylbutane had reacted with about a 70% selectivity to 1,5 dichloro-3,3-dimethylpentane.

EXAMPLE II

Similar runs as in Example I were conducted, utilizing varying conditions and times. The results are presented in the table below:

*Table I*

REACTION OF ISOPRENE DIHYDROCHLORIDE (1,3 DICHLORO-3-METHYLBUTANE) WITH ETHYLENE

[AlCl₃ Catalyst.]

| Conditions: | | | |
|---|---|---|---|
| Temp., °C | 0 | −20 to 0 | −20 |
| Duration, Min | 45 | 240 | 60 |
| Ethylene Pressure | Atm. | Atm. | Atm. |
| Charge, gm.: | | | |
| Isoprene dihydrochloride | 117.9 | b 1,073 | b 246 |
| AlCl₃ | 4.5 | 3.2 | 5.5 |
| Recovery, gm.ᵃ: | | | |
| Isoprene dihydrochloride | 31.2 | 557 | 108 |
| 1,5 Dichloro-3,3-dimethylpentane ᵈ | 75.5 | 445 | 117 |
| Higher boiling chlorides ᶜ | 13.7 | 98 | 18.8 |
| Conversion, Mole Percent | 74.6 | 48 | 56 |
| Selectivity to 1,5 Dichloro-3,3-dimethyl pentane, Mole Percent | 72.6 | 71.9 | 70.8 |

ᵃ Does not include any material lost during workup of product.
ᵇ Includes unconverted isoprene dichloride from preceding run.
ᶜ Material not characterized other than that it contains chlorine and boils above 213° C.
ᵈ Boiling point 209-214 at 765 mm. Hg. Literature value 213° C.

EXAMPLE III

A test was run to ascertain whether vicinal polyhalides, as contrasted to the nonvicinal reactants of this invention, would respond to the treatment utilized herein and give the desired type of particular compounds.

Isobutylene dichloride was prepared from methallyl chloride in two steps:

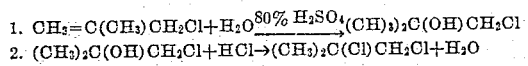

1. $CH_2=C(CH_3)CH_2Cl + H_2O \xrightarrow{80\% H_2SO_4} (CH_3)_2C(OH)CH_2Cl$
2. $(CH_3)_2C(OH)CH_2Cl + HCl \rightarrow (CH_3)_2C(Cl)CH_2Cl + H_2O$ The isobutylene dichloride was recovered as a liquid boiling at 105–112° C. having $n_D^{20}=1.4358$ and density greater than 1. The literature gives for isobutylene chloride: B. P. 106.5° C., $n_D^{20}=1.4360$, $d_4^{20}=1.089$.

The condensation of the isobutylene dichloride with ethylene was carried out using 50.6 grams (0.4 mole) of the dichloride in the presence of 5.5 mole per cent of aluminum chloride catalyst under atmospheric pressure. The dichloride was charged to a cylindrical reactor containing a fitted glass disc at the bottom, through which ethylene was added, and equipped with a water-cooled condenser and thermometer. The reactor was immersed in a Dry Ice-alcohol bath. The dichloride was cooled while passing ethylene through it continuously. The aluminum chloride was added and the reaction mixture permitted to warm up gradually. Effective agitation was achieved by the ethylene vapors. The following observations were recorded:

| Time, Min. | Temperature, °C. | | Δt | Remarks |
|---|---|---|---|---|
| | Reaction Mixture | Bath | | |
| 0 | −40 | −45 | +5 | AlCl₃ added; no reaction noted; slight coloration developed. |
| 25 | −15 | −15 | 0 | |
| 34 | −9 | −9 | 0 | |
| 46 | −3 | −3 | 0 | |
| 61 | +3 | +4 | −1 | |
| 73 | +7.5 | +8.5 | −1 | |
| 79 | +9 | +10 | −1 | |
| 91 | +7 | +8 | −1 | Color had increased to medium red. |

The catalyst was quenched by the addition of wet ice. The organic layer was treated with cold, dilute NaHCO₃ solution and dried with solid K₂CO₃. The product weighed 31.2 grams, indicating substantial entrainment of the isobutylene dichloride or conversion to lower boiling products during the above run. Distillation of the product yielded a small amount of material boiling below 106° C. indicated to be chloro butenes produced by removal of HCl from the dichloride. The main portion of the product (boiling range 106° to 115° C., $n_D^{20}=1.4351$) contained largely unconverted isobutylene dichloride.

The distillation residue (boiling point >157° C.) amounted to 1–2 grams. The coreaction product of isobutylene dichloride and ethylene, 1,4-dichloro-2,2-dimethylbutane, would be concentrated in this residue. Thus, its yield, based on the isobutylene dichloride charged, amounted to not over 1.6 to 3.2 mole per cent. In view of the absence of exothermic heat effects as shown by the data tabulated above, it is evident that isobutylene dichloride does not condense with ethylene under the conditions used.

This experiment demonstrates that vicinal dihalogenated compounds do not result in the production of the desired primary dichloroalkanes to any appreciable extent as compared with the detailed figures of Example II.

EXAMPLE IV

In order to further compare the reaction of a vicinal polyhalide such as described in Example III with the reaction of a nonvicinal polyhalide such as taught in this invention, a run was carried out under identical conditions employed in Example III, but utilizing isoprene dihydrochloride as the reactant.

The results represented below conclusively demonstrate by comparing the delta "t" obtained with isoprene dihydrochloride and isobutylene dichloride, that very little reaction occurred with isobutylene dichloride.

[Charge 55 grams (0.39 moles) isoprene dihydrochloride 5.4 mole % AlCl₃.

| Time, Minutes | Temperature, °C. | | |
|---|---|---|---|
| | Reactor | Bath | Δt |
| 0 | −40 | −50 | +10 |
| 20 | −15 | −35 | +20 |
| 33 | −25 | −28 | +3 |
| 36 | −21 | −22 | +1 |
| 41 | −18 | −20 | +2 |
| 50 | −15 | −18 | +3 |
| 67 | −19 | −27 | +8 |
| 75 | −17 | −22 | +5 |
| 80 | −14 | −20 | +6 |
| 89 | −14 | −18 | +4 |
| 97 | −10 | −17 | +7 |

These figures further demonstrate the marked difference between the process of this invention and the reaction of a vicinal dichloride with ethylene.

There are several distinct advantages inherent in the process of this invention. Among these is the fact that the reaction is straightforward and consequently the desired products are easily and economically separated from other reaction constituents. In addition, products are prepared which cannot be obtained readily by other processes. Other advantages will be apparent to those skilled in the art.

It is to be understood that the invention is not limited to the specific examples, which have been offered merely as illustrations, and that modifications may be made in equipment and conditions within the ranges specified without departing from the spirit of this invention.

What is claimed is:

1. A process for preparing a 1,5 primary dichloroalkane corresponding to the general formula

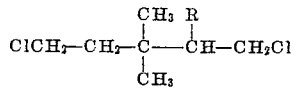

wherein R is a radical selected from the group consisting of hydrogen and methyl radicals, which comprises reacting ethylene with a 1,3 dichloroalkane corresponding to the general formula

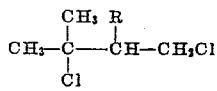

wherein R is a radical selected from the group consisting of hydrogen and methyl radicals, in the presence of a Friedel-Crafts catalyst at temperatures in the range of —30° to 100° C.

2. A process as in claim 1 in which the catalyst is aluminum chloride.

3. A process as in claim 2 in which the 1,3 dichloroalkane is 1,3 dichloro-3-methyl butane.

4. A process as in claim 1 in which the catalyst is aluminum chloride and the 1,3 dichloroalkane is 1,3 dichloro-2,3-dimethyl butane.

References Cited in the file of this patent
UNITED STATES PATENTS

| | | |
|---|---|---|
| 2,419,500 | Peterson et al. | Apr. 22, 1947 |
| 2,666,084 | Detling et al. | Jan. 12, 1954 |